(12) United States Patent
Ryu

(10) Patent No.: US 8,561,091 B2
(45) Date of Patent: Oct. 15, 2013

(54) SINGLE BODY TYPE BRACKET AND DISK DRIVE DEVICE HAVING THE SAME

(75) Inventor: Insool Ryu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 93 days.

(21) Appl. No.: 12/974,757

(22) Filed: Dec. 21, 2010

(65) Prior Publication Data

US 2011/0167438 A1    Jul. 7, 2011

(30) Foreign Application Priority Data

Dec. 21, 2009 (KR) .................. 10-2009-0128310

(51) Int. Cl.
*G11B 7/00* (2006.01)
(52) U.S. Cl.
USPC .......................................................... 720/661

(58) Field of Classification Search
USPC .................................................. 720/658–694
See application file for complete search history.

(56) References Cited

U.S. PATENT DOCUMENTS

| | | | |
|---|---|---|---|
| 2002/0181386 A1* | 12/2002 | Tanaka | 369/249 |
| 2005/0108740 A1* | 5/2005 | Teng | 720/659 |
| 2008/0222668 A1* | 9/2008 | Matsuda et al. | 720/695 |

* cited by examiner

*Primary Examiner* — Joseph Feild
*Assistant Examiner* — Gustavo Polo
(74) *Attorney, Agent, or Firm* — Saliwanchik, Lloyd & Eisenschenk

(57) ABSTRACT

Disclosed is a disk drive device including a spindle motor portion including a stator wound with a coil, a rotor rotating in reaction to the stator, and a rotation shaft that is a rotational center of the rotor; a stepping motor portion including a lead screw to move an optical pick-up device; and a single body type bracket that has the spindle motor portion and stepping motor portion engaged thereto.

9 Claims, 4 Drawing Sheets

SINGLE BODY TYPE BRACKET AND DISK DRIVE DEVICE HAVING THE SAME

This application claims the benefit under 35 U.S.C. §119 of Korean Patent Application No. 10-2009-0128310, filed Dec. 21, 2009, which is hereby incorporated by reference in its entirety.

BACKGROUND OF THE DISCLOSURE

1. Field of the Invention

The present disclosure relates to a single body type bracket and disk drive structure having the same.

2. Discussion of the Related Art

Generally, an optical disc drive (ODD) reads out data recorded on a disc or records data on the disc using a laser beam.

The optical disc drive needs a spindle motor to rotate the disc at a high speed, an optical pick-up device used to read out data stored on the disc rotating at a high speed or record data on the disc, and a stepping motor which includes a lead screw to move the optical pick-up device on the disc.

An optical disc drive known in the art has a spindle motor, an optical pick-up device, a stepping motor and a limit guide that are individually assembled in an optical disc drive body and these components are connected with one another using a flexible cable or the like. Therefore, there is occurred a problem that their assembling becomes complicated and a number of flexible cables are needed.

BRIEF SUMMARY

According to the present disclosure, there is provided a disk drive device in which assembling is convenient by forming a spindle motor portion to rotate a disc, an optical pick-up device and a spindle motor portion to move the optical pick-up device in a single body type bracket and cables to connect the spindle motor portion and a stepping motor portion are removed.

In an embodiment of the present disclosure, a disk drive device includes a spindle motor portion including a stator wound with a coil, a rotor rotating in reaction to the stator, and a rotation shaft that is a rotational center of the rotor; a stepping motor portion including a lead screw to move an optical pick-up device; and a single body type bracket that has the spindle motor portion and stepping motor portion engaged thereto.

In another embodiment of the present disclosure, a single body type bracket for a disk drive device includes a body formed with a coupling hole, a first bent portion formed by cutting a portion of the body and bending the cut portion, and formed with a first through hole, and a second bent portion formed by cutting a portion of the body and bending the cut portion, and formed with a second through hole that faces the first bent portion and that is formed with a second through hole at a position corresponding to that of the first through hole.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION

Hereinafter, an embodiment of the present disclosure will be described with reference to the accompanying drawings.

Figure 1:
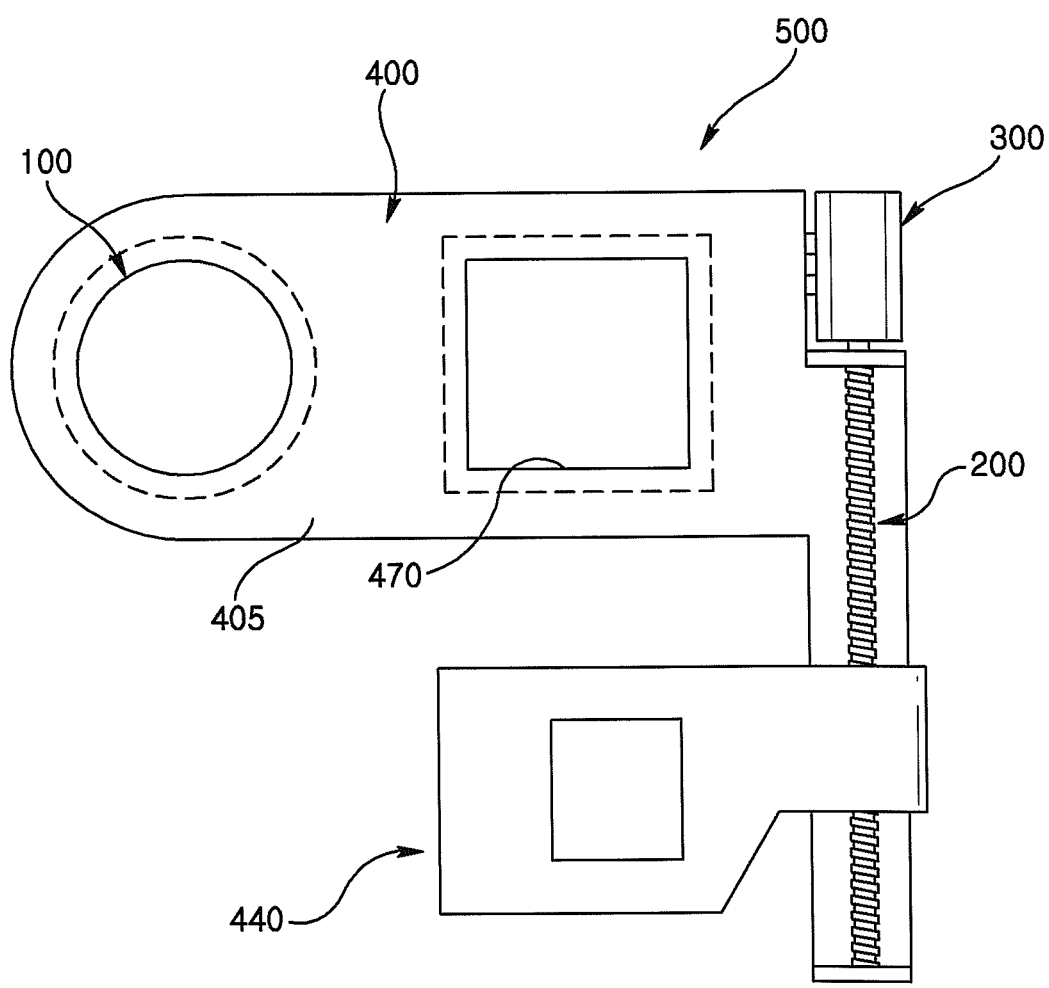
FIG. 1 is a plan view showing a disk drive device according to an embodiment of the present disclosure.
Figure 2A:
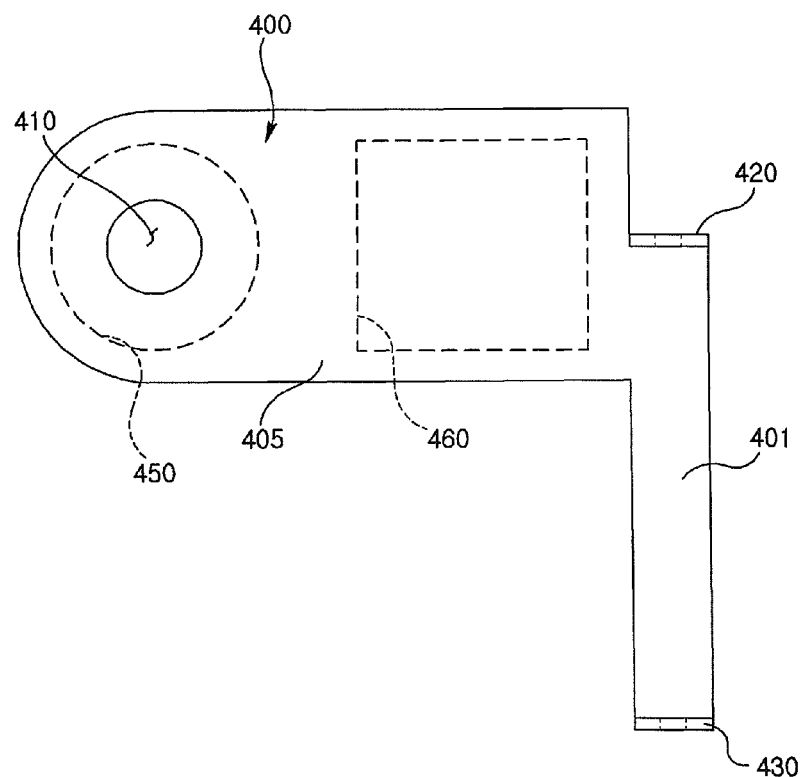
FIG. 2A is a plan view showing a single body type bracket of FIG. 1.
Figure 2B:
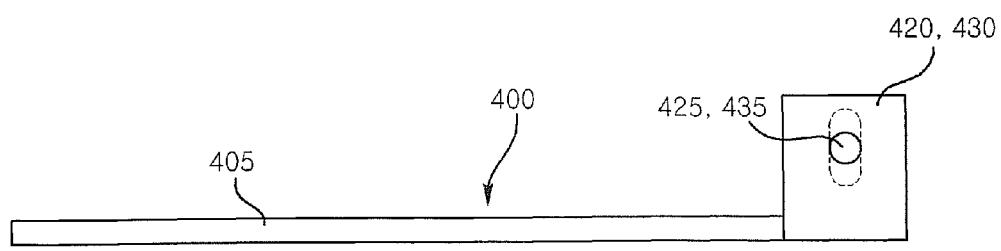
FIG. 2B is a side view showing a single body type bracket of FIG. 2A.

FIG. 1 is a plan view showing a disk drive device according to an embodiment of the present disclosure; FIG. 2A is a plan view showing a single body type bracket of FIG. 1; and FIG. 2B is a side view showing a single body type bracket of FIG. 2A.

Referring to FIG. 1, a disk drive device 500 includes a spindle motor portion 100, a stepping motor portion 300 having a lead screw 200, a single body type bracket 400, and an optical pickup 440 coupled to the lead screw 200.

Figure 3:
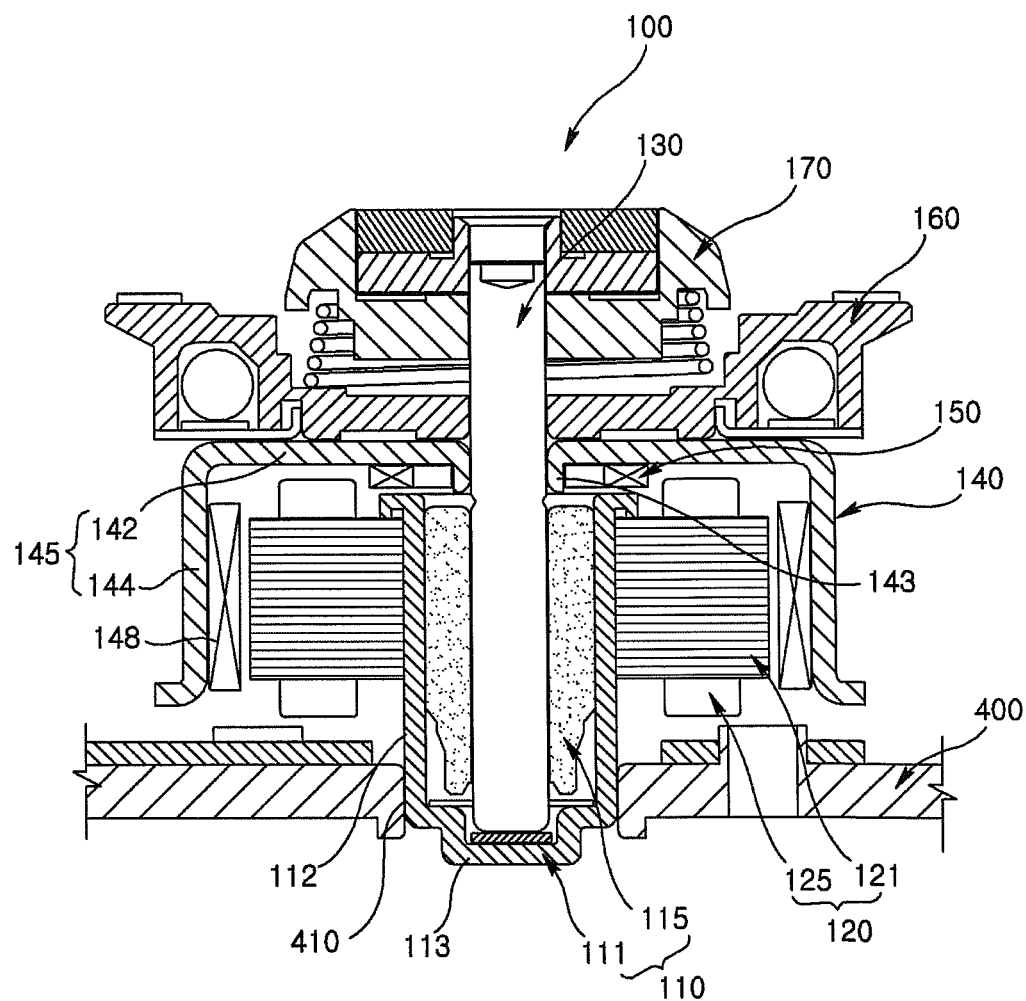
FIG. 3 is a sectional view of a spindle motor portion mounted on a single body type bracket shown in FIG. 1.

FIG. 3 is a sectional view of a spindle motor portion mounted on a single body type bracket shown in FIG. 1.

Referring to FIGS. 1 and 3, the spindle motor portion 100 includes a bearing assembly 110, a stator 120, a rotation shaft 130, a rotor 140 and a suction magnet 150. Additionally, the spindle motor portion 100 may include a turn table 160 and a center cone 170.

The bearing assembly 110 includes a bearing housing 111 and a bearing 115.

The bearing housing 111 is formed in a cylindrical shape whose top is opened, and may include metal.

The bearing housing 111 formed in a cylindrical shape whose top is opened, includes a side panel 112 and a bottom panel 113.

The side panel 112 of the bearing housing 111 is formed in a cylindrical shape, for example, and the bottom panel 113 is formed in the bottom of the side panel 112. In an embodiment of the present disclosure, the side panel 112 and bottom panel 113 may be formed in a single body by a press process.

The top of the side panel 112 of the bearing housing 111 is bent towards the outside of the side panel 112.

The bearing 115 is received in a storage space formed in the bearing housing 111 and the bearing 115 is formed in a cylindrical shape having a rotation shaft hole formed therein.

The bearing housing 111 of the bearing assembly 110 is engaged to a single body type bracket to be described below. The single body type bracket 400 has a hole 410 formed therein, to which the bearing housing 111 is engaged. There is formed a motor area 450 around the hole 410, in which a spindle motor portion 100 to be described is mounted.

The stator 120 includes a core 121 and a coil 125.

The core 121 is formed by stacking thin pieces of iron, and there is formed a through hole in the center of the core 121, the through hole being engaged with a side panel 112 of the bearing housing 111. The coil 125 is wound around the core 121, and a magnetic field is generated from the coil 125 as current is applied to the coil 125 wound around the core 121.

The upper surface of the core 121 is contacted with a bent portion of the side panel 112 of the bearing housing 111, and so the core 121 is inhibited from being detached from the upper portion of the side panel 112 of the bearing housing 111.

The rotation shaft 130 is rotatably inserted into the rotation shaft hole of the bearing 115 received in the bearing housing 111.

The rotor 140 includes a yoke 145 and a magnet 148.

The yoke 145 is formed in a cylindrical shape whose bottom is opened. More specifically, the yoke 145 includes a yoke upper panel 142 and a yoke side panel 144.

The yoke upper panel 142 is formed in a thin disc shape, and a yoke burring portion 143 is formed in the central portion of the yoke upper panel 142. The yoke burring portion 143 is engaged with the rotation shaft 130, and the yoke upper panel 142 rotates together with the rotation shaft 130 as the yoke burring portion 143 is engaged with the rotation shaft 130.

The yoke side panel 144 extends downwardly from the outer edge of the yoke upper panel 142.

A magnet 148 is arranged inside the yoke side panel 144 to face the core 121. The yoke 145 and rotation shaft 130 rotate by the force produced by magnetic fields generated from the magnet 144 and generated from the coil 125 wound around the core 121.

The suction magnet 150 is arranged on the bottom of the yoke 145 facing the core 121 of the yoke 145. The suction magnet 150 is formed in a circular ring shape when viewed in plan view.

While FIG. 3 shows and describes the spindle motor portion 100 including the stator 120, the rotor 140 and the rotation shaft 130, the spindle motor portion 100 may include a variety of technical constructions in an embodiment of the present disclosure and a construction of the spindle motor portion 100 is not limited in an embodiment of the present disclosure.

Figure 4:
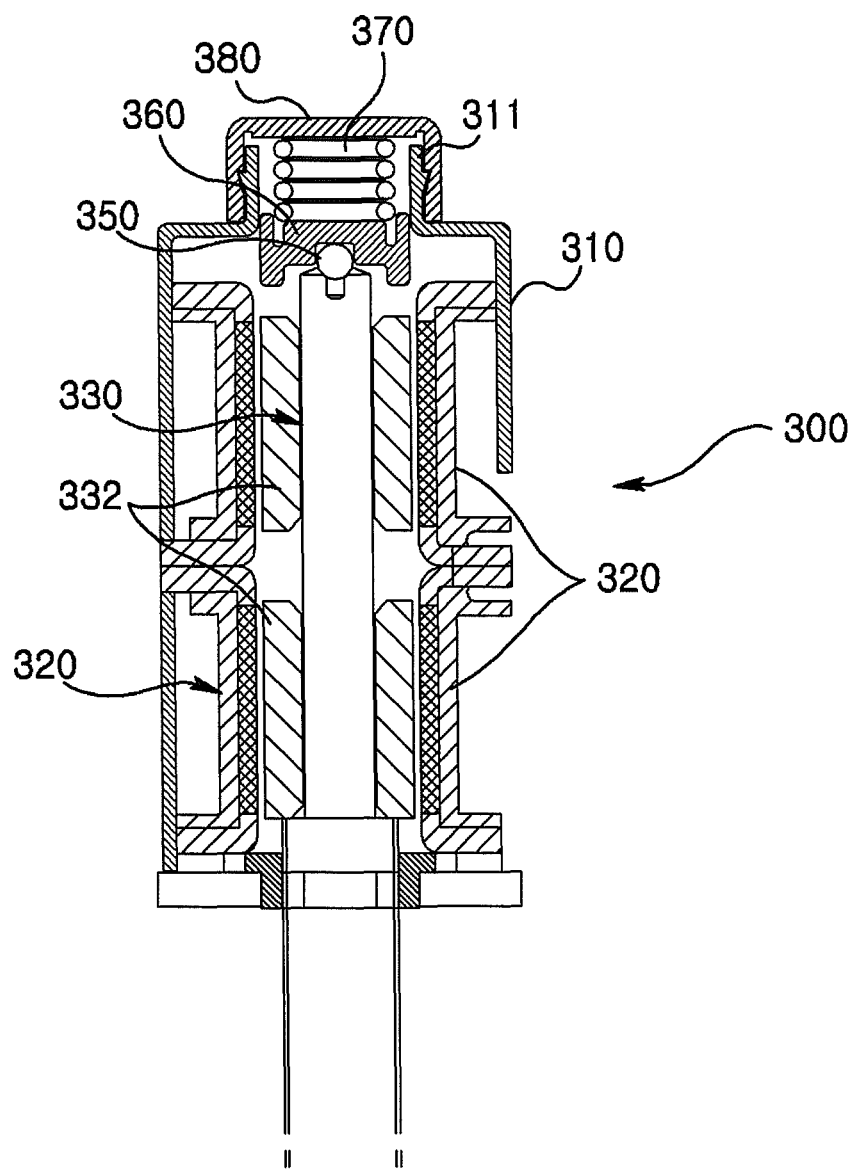
FIG. 4 is a sectional view of a stepping motor portion mounted on a single body type bracket shown in FIG. 1.

FIG. 4 is a sectional view of a stepping motor portion mounted on a single body type bracket shown in FIG. 1. Referring to FIG. 4, a step motor portion 300 of the present disclosure includes a housing 310, a stator 320, a rotor 330, a thrust bearing 360, a spring 370, and a stopper 380.

An opening part is formed at one side of the housing 310, and a guide part 311 is formed at the other side of the housing 310 so as to guide the thrust bearing 360 an axial direction of a rotation shaft that extends from a lead screw.

The stator 320 is disposed inside the housing 310 so as to form a magnetic field.

The rotor 330 includes the lead screw, and a magnet 332 which is fixed to a part of the lead screw. The magnet 332 is inserted into the stator 320 so as to have a desired gap, and the lead screw is rotatably supported by a bearing device.

The thrust bearing 360 is formed into a cap shape so as to be guided through the guide part 311 of the housing 310. The thrust bearing 360 rotatitively supports the end portion of the rotation shaft. The thrust bearing 360 is elastically pressed by the spring 370. The spring 370 functions to provide pre-load so that the lead screw can be rotated precisely.

The stopper 380 is coupled to the guide part 311 of the housing 310 so as to fix the thrust bearing 360 and the spring 370 to an inside of the housing 310.

Referring to FIGS. 1, 2A, and 2B again, a single body type bracket 400 includes a body 405, a hole 410, a first bent portion 420 and a second bent portion 430. The body 405 of the single body type bracket 400 may include a metal board or a printed circuit board. According to an embodiment of the present disclosure, the spindle motor portion 100 and the stepping motor portion 300 having the lead screw 200 mounted therein are formed in a single body on the one body type bracket 400.

The single body type bracket 400 may be formed in an L-shape when viewed in plan view.

The hole 410 formed on the body 405 is formed in the single body type bracket 400, into which a bearing housing 111 of the spindle motor portion 100 is inserted and they are engaged with each other. A burring portion may be formed in a portion corresponding to the hole 410 of the single body type bracket 400.

The first bent portion 420 is formed by cutting and bending part of the single body type bracket 400, which has a through hole 425 or a screw hole formed to engage with one end of the lead screw 200 of the stepping motor portion 300. The through hole 425 may include an oblong hole (shown dotted in FIG. 2B) of a circular shape, or that is extended to an upper surface of the body 405.

The second bent portion 430 is formed in the single body type bracket 400 to face the first bent portion 420, which is formed by cutting and bending part of the single body type bracket 400.

The second bent portion 430 has a through hole 435 or a screw hole formed to engage with the other end of the lead screw 200 facing the one end of it. A housing 325 of the stepping motor portion 300 is engaged with the second bent portion 430 and so the stepping motor portion 300 is engaged with the single body type bracket 400 in a single body.

The body 405 of the single body type bracket 400 may include a connecting portion 401 to connect the first and second bent portions 420 and 430 and a board attaching portion 460 on which a driving board 470 is arranged, the driving board 470 having circuit parts to drive the spindle motor portion 100 and stepping motor portion 300 mounted thereon.

According to an embodiment of the present disclosure, since the spindle motor portion 100 and stepping motor portion 300 are assembled on the single body type bracket 400 in a single body and the driving board 470 to control the spindle motor portion 100 and stepping motor portion 300 is arranged on the board attaching portion 460, it is possible to electrically connect the spindle motor portion 100 and stepping motor portion 300 to the driving board 470 without a separate cable.

According to the detailed description above, there is an effect in that the assembly process is more simplified by forming the spindle motor portion to rotate the disc and the stepping motor portion including the lead screw to move the optical pick-up on the single body type bracket in a single body and the cable to connect the spindle motor portion and stepping motor portion is not necessary.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:
1. A disk drive device, comprising:
a spindle motor portion for rotating an optical disk;
a stepping motor portion including a lead screw to move an optical pick-up device that is moved to a direction of radius of the optical disk; and
a single body type bracket that is integrally formed with the spindle motor portion and the stepping motor portion, wherein the single body type bracket includes a first bent portion that is a portion of the single body type bracket bent in order to rotatably support one end of the lead screw, a second bent portion that faces the first bent portion along an axial direction of the lead screw and supports a side of the stepping motor portion, and a connecting portion that connects the first bent portion to the second bent portion, wherein the single body type bracket has a hole to fix the spindle motor portion thereto, and wherein the single body type bracket is attached with a driving substrate mounted with the spindle motor portion and a circuit component that drives the spindle motor portion and the stepping motor portion, and the driving substrate is interposed between the spindle motor portion and the stepping motor portion.

2. The disk drive device according to claim 1, wherein a burring portion for fixing the spindle motor portion is formed at an area corresponding to the hole in the single body type bracket.

3. The disk drive device according to claim 1, wherein each of the first and second bent portions is formed with a through hole through which the lead screw passes.

4. The disk drive device according to claim 1, wherein the through hole includes a round through hole or an oblong hole for adjusting a height of the lead screw.

5. The disk drive device according to claim 1, wherein the single body type bracket includes a metal substrate.

6. The disk drive device according to claim 1, wherein the single body type bracket includes a printed circuit board.

7. The disk drive device according to claim 1, wherein the single body type bracket takes the shape of a letter 'L' when viewed on a plane.

8. The disk drive device according to claim 1, wherein the spindle motor portion includes a bearing assembly in which a bearing is accommodated, a stator fixed at a periphery of a bearing housing, a rotation shall rotatably coupled to the bearing, and a rotor coupled to the rotation shaft.

9. The disk drive device according to claim 1, wherein the stepping motor portion includes a rotor attached at a periphery thereof with a magnet and formed at a portion thereof with the lead screw, a stator wrapping the rotor and wound with a coil, and a housing accommodating the stator.

* * * * *